Patented Apr. 20, 1937

2,077,412

UNITED STATES PATENT OFFICE 2,077,412

PROCESS FOR THE PREPARATION OF A MOLDED CELLULOSE FOAM FROM VISCOSE AND PRODUCT THEREOF

Reginald Oliver Herzog, Berlin-Steglitz, and Helmut Hoffmann, Berlin-Lichterfelde, Germany; Maria Brunhilde Herzog, administratrix of said Reginald Oliver Herzog, deceased, assignors of forty per cent to Eugene J. Lorand, Wilmington, Del.

No Drawing. Application May 27, 1931, Serial No. 540,496. In Germany June 4, 1930

13 Claims. (Cl. 18—48)

The invention concerns an artificial bulky material which is resistant to bending and pressing under ordinary conditions of use, and which has a low specific gravity, and a process for its manufacture. The artificial material consists of a rigid foam of viscose, poured and coagulated in molds. In the finished product are numerous enclosed hollow spaces or cells which are very fine and in part visible only when magnified. The cells are separated by thin walls.

The material can be cut, bored, planed etc. It can also be plasticized by appropriate treatment such as moistening, especially also by a treatment with steam under pressure, and then through bending, pressing, etc. can be worked into new forms. Since the material can be easily poured into molds, practically any form desired can be obtained.

The peculiar structure of the material allows for a whole series of technical applications. The substance is an excellent material for heat insulation. The structure of the small closed hollow spaces or cells makes the substance impermeable to liquids and gaseous currents, so that the heat can in no way be transferred through by convection. A transfer of the heat by conduction is likewise almost completely impossible, as the enclosed air is a very poor conductor of heat and the thin walls which consist of cellulose are also very poor conductors.

The described substance is further usable for sound insulation. The peculiar toughness of the cell walls prevents vibration and thus absorbs all sounds.

When used as a packing material, this toughness together with the solidity of the cell walls is very useful in absorbing blows received during transportation and thus the substance can protect very fragile objects from breakage. The low specific gravity is, in addition to the saving of material, especially advantageous as far as costs of transportation are concerned.

While the material is impermeable to liquid and gaseous currents, the diffusion of liquids and gases is indeed reduced but not prevented. This is of special importance when substances are to be absorbed or given up only slowly. In such cases, the cellulose foam acts as carrier of the absorbed substance or, in general, of the substance which is to be gradually given up (desorbent). The addition of this substance can take place either during the preparation of the foam or also afterwards by soaking or impregnating. For example, the cellulose can be soaked up with potassium xanthate which gradually gives up carbon disulfide.

This makes the impregnated cellulose foam very useful in combatting the vine louse, Phylloxera (vastatrix). When an acceleration of the giving off or taking up is desired, the cells can be partly or totally opened by a suitable mechanical treatment, for example by sticking needles through the material, or else the cells can be exploded by a sudden pressure release when the material is in either a dry or a moist condition.

The ease with which any form can be given to the mass makes it especially useful in the manufacture of plastic products of all sorts, such as plates, tubes, slabs, stands of all shapes, toys, advertising articles, show-window and theatre decorations. Further, handles, cigarette mouthpieces, cigar and cigarette holders, lemonade drinking tubes and the like can also be manufactured.

According to our invention, the artificial material can be prepared in the following way. Liquid viscose is transformed into a foam and the conversion into cellulose so conducted that the foam structure remains.

The production of the foam can take place in the well-known ways, for example through beating or forcing in of air, through mixing with air or spraying through a spraying gun, through mixing with substances which give off gases etc. In order to promote the formation of a foam, small quantities of albumin, soap, fatty acids especially oleic acid, saponin, natural substances containing saponin, dextrin or rubber materials can be added.

It is better to use a viscose with a lower alkali content than is generally used in the artificial silk industry (less than 6%). An advantageous solution can be obtained by dissolving the cellulose xanthate in water instead of in a caustic soda solution. By squeezing out the excess alkali cellulose more than usual before the xanthation, it is possible to further reduce the alkali content of the viscose. In order to obtain especially light foams, the free alkali can further be displaced or washed out of the xanthate before the dissolving, with the help of acetic acid, salt solutions, alcohols and the like.

The foam is then poured into suitable forms, or molds, such as open dishes or tubes. The molds may be made of some cheap material such as pasteboard or paper.

The foam, produced and molded in the fashion described above, is then solidified by regenerating the cellulose. Two definite processes have proved to be especially useful.

The coagulation with aqueous acid or salt solutions has the disadvantage that it progresses through the mass only very slowly because the acids and the salts can travel only in the very thin cell walls, so that the molecules are forced to take a very narrow and very tortuous path. Conversely the necessary washing out of the acids and salts after the coagulation is a very tedious process because even the smallest traces must be removed in order to prevent the formation of the friable hydro-cellulose. Consequently the mass may lack uniformity because the outside part is under treatment longer than the inside.

Compared to the coagulation with aqueous acid or salt solutions, the action of coagulating gases or vapors is, according to our invention, of much greater importance. The gases diffuse much more quickly than the corresponding dissolved substances. Besides, on account of the diffusion properties of gases, these are not only transmitted through the thin cell walls, but they can also diffuse through the air-filled cells and that especially easily. The diffusion can also be accelerated by the use of pressure or of repeated pressure and release. The coagulating treatment is accelerated by warming.

The especially suitable gases are carbon dioxide and sulfur dioxide. The gases may be applied directly on the free surface of the foam or else, forms which are permeable to gases, such as paper, may be used. Washing out of the acid gases by means of gases, air or liquids after the coagulation is not necessary when the presence of these gases would have no bad effects on the cellulose, as is the case when carbon dioxide is used.

In other cases, the coagulated foam may be washed or, still better, treated with gases which neutralize the acid gases. The gas best suited for this purpose is undoubtedly ammonia because, since it is not injurious to the cellulose, an exact neutralization is not necessary, and further, because the ammonia becomes more and more diluted through diffusion and evaporation.

According to our invention, a further method of coagulation is that of the "spontaneous" coagulation. In this case, the cellulose xanthate dissolved in the viscose gradually splits off its $CS_2$ groups and transforms itself finally into cellulose after a certain time which, depending on the conditions of the experiment, varies between a few days and several weeks. It is surprising that this slowly progressing process can be used in connection with an unstable foam. The following conditions are important for the carrying out of the spontaneous coagulation in the right way:

1. The spontaneous coagulation is accelerated by heating.
2. The viscose used should be as free from alkali as possible because alkali retards the spontaneous coagulation.
3. The viscose used should be highly aged, as this lessens the time necessary for the complete solidification. The use of highly aged viscose has at the same time the advantage that the foam during the drying process shrinks only slightly and quite uniformly.
4. An addition of salts which help the spontaneous coagulation, such as sodium chloride, is to be recommended, but only to an extent which will not interfere with the easy pouring of the foam.

When the coagulation is complete, a washing treatment can be added in order to partly or totally remove all non-cellulosic constituents. After that follows the drying treatment. In many cases, the washing can be omitted when the foreign materials have no bad influence on the stability of the foam and are in no other way injurious.

Very light but still solid foams can be prepared according to the process described. The specific gravity varies according to the chosen conditions, well between the values of 0,05 and 1,00. The solidity depends on the specific gravity and on the sort of bubbles or cells but even the lightest foams prepared in this way possess a very surprising strength.

Example 1

250 grammes of cellulose xanthate containing about 28% cellulose and 10% alkali are dissolved in 750 grammes of water after kneading during many hours. The ripeness of this solution is then determined by titration with a 10% solution of ammonium chloride. 20 cc. of the viscose, after addition of 30 cc. of water, are coagulated by about 23 cc. of the ammonium chloride solution. The viscosity is characterized by the fact that a steel ball 5 millimetres in diameter falls a distance of 10 centimetres in 25 seconds. To 500 grammes of this viscose are added 250 grammes of water and, after the further addition of 5 cc. of oleic acid, the whole is worked during about 10 minutes in one of the well-known foam-beating apparatus. The resulting foam has a specific gravity of about 0,50. The foam is then poured into a pan and coagulated with gaseous sulfurous acid. After washing and drying, the foam has a specific gravity of 0,10.

Example 2

The viscose prepared as above is at first worked into a foam, after it has reached a ripeness of 2 cc. of 10% ammonium chloride solution, and is therefore almost coagulated. 10 cc. of 20% solution of sodium chloride is added to the foam, which is then poured into pans. The pans are warmed to about 50° C. whereby the coagulation is entirely complete within 24 hours. The plate or slab produced is dried directly.

The solidity of the finished product can be increased by drying in such a way that a strong crust is formed on the surface which protects the softer inside layers. This effect will be obtained especially when, during the washing, the foam receives before and after the coagulation a superficial pre-drying. When molds of paper or the like have been used to shape the material, these will also strengthen the surface layers. A further strengthening is also possible when the substance is washed with hard water, whereby salts are precipitated on the surface.

According to this invention, the prepared foams may be colored in any way and through admixture with other substances, their properties can be considerably altered. These added substances may be classified as fillers, plastifiers, substances used for impregnation and binders. The fillers act mechanically, the plastifiers, impregnating agents and binders have a chemical or physico-chemical influence.

As fillers can be used the following materials: textile fibers, wood fiber, paper pulp, animal hair, asbestos etc. Through the addition of such foreign substances, the solidity of the foam is very much increased. Similarly, cork, in small pieces or in powder form, sawdust, mechanical wood pulp and indifferent powders all act as fillers.

Among the plastifiers may be named glycerine and other hygroscopic substances such as glycol. On account of their water-attracting properties, these substances prevent the complete drying of the foam and thus keep it constantly flexible. It is possible to prepare elastic foams in this way, which, in their properties, closely resemble rubber. The action of glycerine can be improved through the further addition of substances like polysaccharides, soaps, etc. It is not necessary to add these plastifiers to the foam while it is being formed, but it is sufficient to treat it when it is finished or at least when it is coagulated.

As impregnating agents are especially useful such substances as ammonium salts or borax which reduce greatly the inflammability of the cellulose. Further, substances which reduce the sensitiveness of the cellulose to water, for instance water-repelling substances like aluminum soaps, latex, bakelite, paraffin emulsions, tar products etc. can also be used. The substances used for the impregnation can be added during the formation of the foam or afterwards.

The increase in the impermeability to water can also be obtained by applying the well-known process called sthenosage.

Among the binders may be mentioned gypsum, cement and similar water-combining substances which can be added in quantities much above the cellulose content of the artificial material. The resulting mixtures are not only porous but also relatively tough and easily worked and above all are fireproof.

Through various combinations of these added substances other results may be obtained and thus the properties of the resulting substance may be changed in accordance with technical requirements.

What we claim is:

1. A process for the preparation of slabs, blocks and the like in any desired shape from viscose, said slabs, blocks, etc. having a light cellular foam-like structure, comprising the steps of converting the viscose into a foam, which will hold the bubbles embedded therein, molding the viscose foam in a mold into any desired shape and regenerating the cellulose from the molded viscose by spontaneous decomposition while in the molded state, for forming a solid mass.

2. A process for the preparation of slabs, blocks and the like in any desired shape from viscose, said slabs, blocks, etc. having a light cellular foam-like structure, comprising the steps of converting the viscose into a foam, which will hold the air bubbles embedded therein, molding the viscose foam in a mold into any desired shape and regenerating the cellulose from the molded viscose by spontaneous decomposition, accelerated by the application of heat while in the molded state for forming a solid mass.

3. A process for the preparation of slabs, blocks and the like in any desired shape from viscose, said slabs, blocks, etc. having a light cellular foam-like structure, comprising the steps of converting the viscose into a foam, which will hold the bubbles embedded therein, said foam containing in liquid form an agent for accelerating coagulation, such as a sodium chloride solution, molding the viscose foam in a mold into any desired shape, and regenerating the cellulose from the molded viscose by spontaneous decomposition while in the molded state.

4. A process for the preparation of slabs, blocks and the like in any desired shape from viscose, said slabs, blocks, etc. having a light cellular foam-like structure, comprising the steps of adding oleic acid to the viscose for helping the formation of a foam, converting the viscose into a foam, which will hold the air bubbles embedded therein, molding the viscose foam in a mold into any desired shape and regenerating the cellulose from the molded viscose by spontaneous decomposition while in the molded state.

5. A process for the preparation of slabs, blocks and the like in any desired shape from viscose, said slabs, blocks, etc. having a light cellular foam-like structure, comprising the steps of dissolving cellulose xanthate in water, converting such solution into a foam, which will hold the air bubbles embedded therein, molding such foam in a mold into any desired shape, and regenerating the cellulose from the molded viscose by spontaneous decomposition while in the molded state, for forming a solid mass.

6. A process for the preparation of slabs, blocks and the like in any desired shape from viscose, said slabs, blocks, etc. having a light cellular foam-like structure, comprising the steps of ripening the viscose close to the beginning of coagulation, converting the viscose into a foam, which will hold the air bubbles embedded therein, molding the viscose foam in a mold into any desired shape, and regenerating the cellulose from the molded viscose by spontaneous decomposition while in the molded state, for forming a solid mass.

7. As a new article of manufacture, a molded slab or block composed of regenerated cellulose having a mass of minute air bubbles embedded in and homogeneously distributed throughout, the article being of a regular predetermined shape, and having substantial length, breadth and thickness and possessing rigidity in each dimension, being a non-conductor of heat and sound and capable of being readily cut and bored.

8. As a new article of manufacture, a molded slab or block composed of regenerated cellulose having a mass of minute bubbles embedded in and homogeneously distributed throughout, said block or slab containing a filler, and being of a regular predetermined shape, and having substantial length, breadth and thickness and possessing rigidity in each dimension, being a non-conductor of heat and sound and capable of being readily cut and bored.

9. As a new article of manufacture, a molded slab or block composed of regenerated cellulose having a mass of minute bubbles embedded in and homogeneously distributed throughout, said block or slab containing a plastifier, and being of a regular predetermined shape, and having substantial length, breadth and thickness and possessing rigidity in each dimension, being a non-conductor of heat and sound and capable of being readily cut and bored.

10. As a new article of manufacture, a molded slab or block composed of regenerated cellulose having a mass of minute bubbles embedded in and homogeneously distributed throughout, said block or slab containing an impregnating agent, and being of a regular predetermined shape, and having substantial length, breadth and thickness and possessing rigidity in each dimension, being a non-conductor of heat and sound and capable of being readily cut and bored.

11. As a new article of manufacture, a molded slab or block composed of regenerated cellulose having a mass of minute bubbles embedded in and homogeneously distributed throughout, said block or slab containing a binder, and being of a regular predetermined shape, and having substantial length, breadth and thickness and possessing rigidity in each dimension, being a non-conductor of heat and sound and capable of being readily cut and bored.

12. A process for the preparation of slabs, blocks and the like in any desired shape from viscose, said slabs, blocks, etc., having a light cellular foam-like structure, comprising the steps of converting viscose containing less than 6% alkali into a foam, which will hold the bubbles embedded therein, molding the viscose foam in a mold into any desired shape and regenerating the cellulose from the molded viscose by spontaneous decomposition while in the molded state, for forming a solid mass.

13. A process for the preparation of slabs, blocks and the like in any desired shape from viscose, said slabs, blocks, etc., having a light cellular foam-like structure, comprising the steps of adding at least one of the following substances to the viscose for aiding the production of foam: oleic acid, albumin, a soap, a fatty acid, saponin, a natural substance containing saponin, dextrin, a rubber material; converting the viscose into a foam, which will hold the bubbles embedded therein, molding the viscose foam in a mold into any desired shape and regenerating the cellulose from the molded viscose by spontaneous decomposition while in the molded state.

REGINALD OLIVER HERZOG.
HELMUT HOFFMANN.